Feb. 14, 1939.  L. R. TALLMAN  2,147,469
POWER DISTRIBUTING MECHANISM
Filed April 24, 1936  3 Sheets-Sheet 1
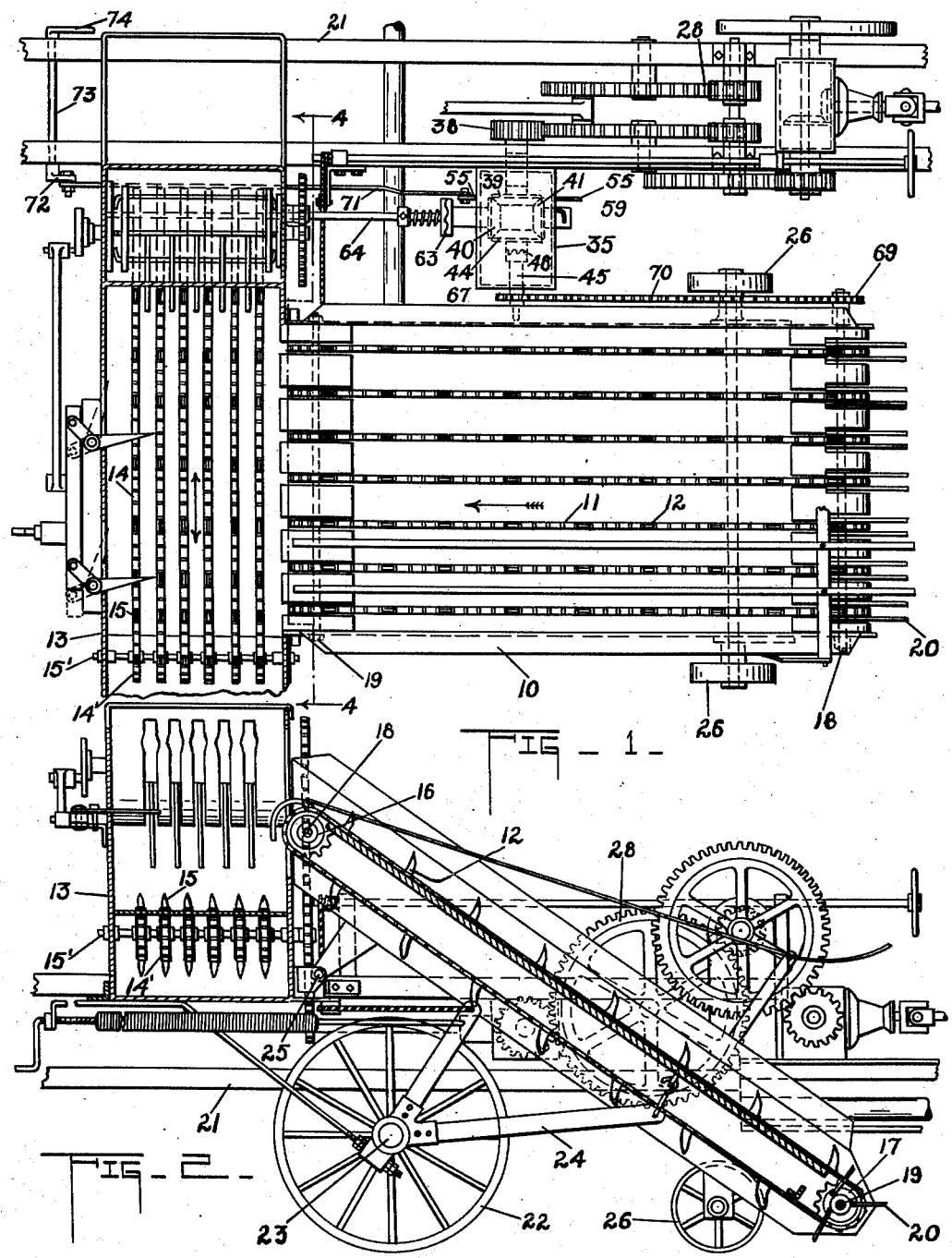
INVENTOR
Leslie R. Tallman
BY
Zefft v Zefft
ATTORNEYS

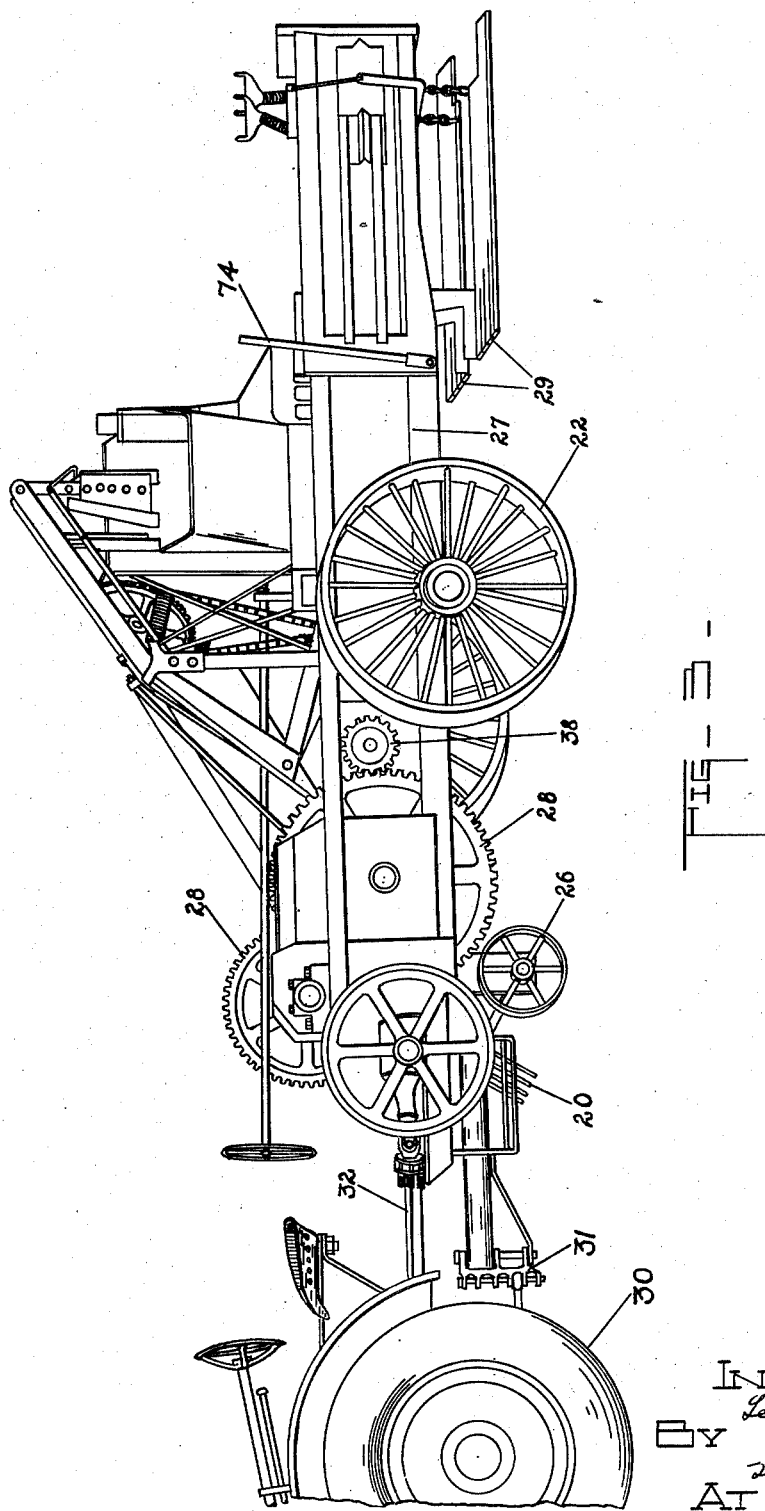

Feb. 14, 1939.   L. R. TALLMAN   2,147,469
POWER DISTRIBUTING MECHANISM
Filed April 24, 1936   3 Sheets-Sheet 3
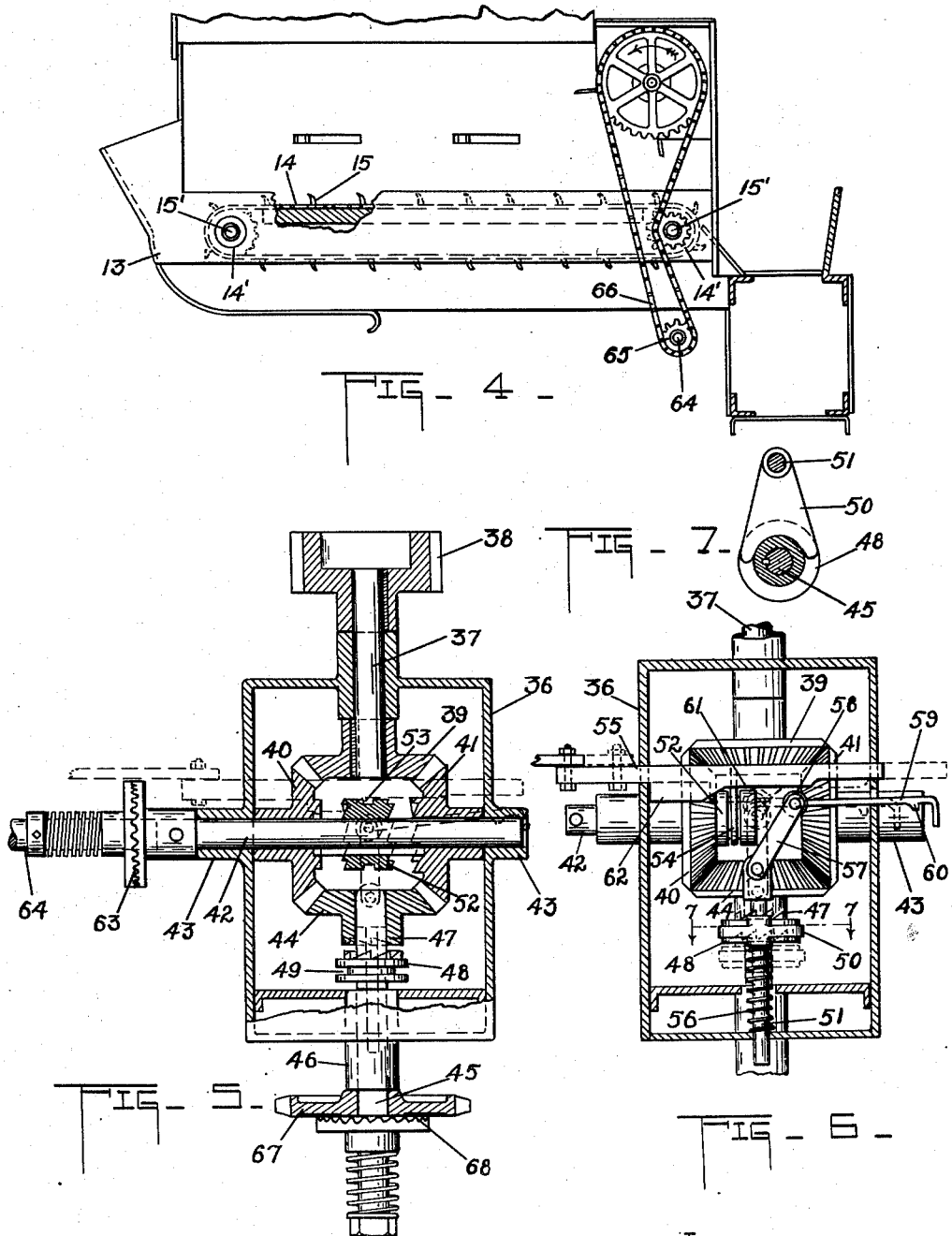
INVENTOR
Leslie R Tallman
BY
ATTORNEYS Patented Feb. 14, 1939

2,147,469

UNITED STATES PATENT OFFICE 2,147,469

POWER DISTRIBUTING MECHANISM

Leslie R. Tallman, Shelbyville, Ill.

Application April 24, 1936, Serial No. 76,171

1 Claim. (Cl. 100—25)

This invention is directed to a power distributing mechanism to be utilized principally in connection with the pick up and feeding mechanism shown and described in U. S. Patent 2,038,809 to Tallman et al. entitled "Combine baler", dated April 28, 1936.

The invention has for its general object to provide a power distributing mechanism applicable as above set forth, and as a drive mechanism for machines generally known as combine balers, which machines are primarily intended for use in gathering and baling straw or the like while in motion in the field. Such machines ordinarily include a baler mechanism to which pick-up and feeder devices are attached, the whole forming an apparatus capable of gathering straw from the ground and transporting it into the baler which forms it into bales, the operations being performed while the apparatus is in motion across the field.

Locomotion is usually provided by a tractor, which may be of any suitable type. Power for operating the baler and associated mechanism may be provided through a power take-off device to take power from the engine of the tractor or from a separate motor carried on the unit. Power sources suitable for the purpose are well known and will not require detail description.

It will be obvious that the baler mechanism will require power to perform its function and it is my specific object to provide a means to take power from a driven element of the baler mechanism and distribute it to the several elements of the pick-up and feeder mechanism in such a manner that said elements may be driven and controlled independently of each other as will be explained.

In order to clearly illustrate the novel and useful features of the invention I present herein several views showing the apparatus to be driven as well as details of my power distributing mechanism.

In the accompanying drawings:

Fig. 1 is a plan view showing the baler pick-up and feeder elements together with the distributing mechanism referred to;

Fig. 2 is a side elevational view of the pick-up and feeder elements with certain parts shown in section;

Fig. 3 is a side elevational view of a baler mechanism taken from the side opposite Fig. 2, showing a control element to be referred to;

Fig. 4 is a sectional view taken from line 4—4 in Fig. 1;

Fig. 5 is a sectional plan view showing details of the power distributing mechanism to be described;

Fig. 6 is a view similar to Fig. 5 with certain of the parts in full line and other parts in operated position; and Fig. 7 is a sectional view taken on line 7—7 in Fig. 6.

In view of the fact that the devices shown herein are shown and described in detail in the aforementioned application for patent, detail description of the baler, pick-up and feeder devices is thought unnecessary further than to say that 10 designates a frame which carries an elevator conveyor mechanism consisting of a series of chains 11 having spikes 12.

The elevator conveyor is disposed to have one end near the ground and the opposite end disposed so as to discharge into a cross feed conveyor 13 which also consists of a number of parallel chains 14 having spikes 15.

Chains 11 are carried upon sprocket wheels 16 and 17 which are secured to upper and lower shafts 18 and 19 respectively. The lower shaft 19 also carries and operates a pick-up mechanism consisting of a series of tines 20. In operation the machine is moved in the field toward the right in Figs. 1 and 2 and the chains 11 are driven in unison in direction toward the cross feed conveyor 13. The pick-up device is adapted to pick up straw from the ground and place it upon the spikes 12 whereby it is elevated and discharged into the cross feed conveyor.

The chains 14 of the cross feed conveyor run over sprocket wheels 14' which are affixed to shafts 15' disposed in opposite ends of the frame as shown best in Fig. 4.

The cross feed conveyor is to be driven in opposite directions or stopped at the will of an operator as will be described, whereby it receives the straw delivered by the elevator conveyor and transports it toward and into the baler mechanism 21, or in the opposite direction for a purpose to be described.

The baler mechanism 21 is of the conventional type which is usually supported for portability upon ground wheels 22. Conveyor 10 is supported partly on the shaft 23 of ground wheels 22 through the framing structure 24, partly on the pivot 25 attached to the frame of the cross feed conveyor 13 and partly on the ground wheels 26. The cross feed conveyor is supported by suitable framing upon the frame structure of the baler mechanism 21, all as described in detail in the aforementioned patent.

The baler mechanism 21 consists of conventional frame 27 upon which is mounted the several mechanisms necessary for baling, including the gear mechanism designated 28 and facilities for tying and discharging the bales shown at the right hand end in Fig. 3. At this end platforms 29 are disposed on both sides of the frame for the convenience of operators who tie the bales and control the several elements of the machine.

For the purpose of illustration I show the forward end of the baler attached to and supported by a tractor 30 through a drawbar 31. The tractor is equipped with a power take-off mechanism 32 which is conencted in the conventional manner to drive the gear mechanism 28.

It will be apparent that the machine described is adapted to be drawn over a field to pick up straw from the ground and to transport it into the baler, which forms it into bales to be tied and discharged, all while the machine is in motion. Further, it will be apparent that the machine is suitable for baling while it remains stationary, as when it is desired to bale from a stack.

Under conditions of practical use when baling in motion, the straw is picked up and delivered to the cross feed conveyor in a substantially continuous stream. The cross feed conveyor, when run toward the baler, delivers the straw to the baler in a like manner. However, as is common baler practice, when a bale of desired size is built up the straw stream must be temporarily stopped while a separating block is inserted at the end of the bale and to accomplish this stopping of the stream I arrange to drive the cross feed conveyor in backward, as well as forward direction so that when a block is to be inserted the cross feed conveyor, which is normally running toward the baler, may be reversed and the straw stream transported away from the baler for the moment required to insert a block. By reversing the cross feed conveyor the feed of the straw stream is stopped at the baler, while at the same time the elevating conveyor is continuously feeding onto the cross feed conveyor. Thus the elevating conveyor functions continuously while the cross feed conveyor is controlled as necessary for the purpose set forth.

When it is desired to use the machine to bale straw from a stack, the straw would be most conveniently pitched from the stack onto the elevating conveyor whereby it is fed to the baler in the manner described. However, experience teaches that the straw is usually pitched in large forkfulls rather than in a continuous stream as when gathered from the ground and this condition of feed makes it somewhat difficult to properly control the stream by means of the cross feed conveyor. Due to the conditions noted it has been found desirable, when changing blocks during stationary baling, to stop the elevating conveyor as well as to reverse the cross feed conveyor.

The foregoing gives an outline of the conditions under which my distrbuting mechanism is to be used and of its utility when used with the apparatus described.

The distributing device consists of a gear and clutch unit mechanism 35 disposed as shown in Fig. 1 or in any other suitable location.

Details of the mechanism are best shown in Figs. 5 and 6. 36 designates a housing-frame structure in the wall of which is journalled a shaft 37 carrying a gear 38 on its outer end and a gear 39 on its inner end.

Gear 39 is meshed with a pair of gears 40 and 41 which are rotatably mounted on a cross shaft 42 journalled in bearing 43 in the side walls of structure 36.

Opposite gear 39 is a similar gear 44 rotatably mounted on a shaft 45 journalled in an elongated bearing 46 supported in the wall of structure 36. The outer face of the hub of gear 44 is provided with teeth 47 which are engageable with similar teeth on the hub of a clutch member 48. Clutch 48 is slidably keyed to shaft 45. It has an annular slot 49 in which is engaged a yoked member 50 affixed to a shaft 51, the latter being offset from shaft 45, see Fig. 7, and mounted to slide in the structure 36. Shaft 51 and its associated mechanism will be referred to again.

Slidably keyed to shaft 42 and disposed between gears 40 and 41 is a clutch member 52 having teeth on each end adapted to engage with cooperative teeth on the inner faces of the opposite gears. Member 52 has an annular slot 53 in which is engaged a yoked member 54. Yoke 54 is secured to a bar 55 disposed crosswise of the unit as shown in Fig. 6 and mounted to slide in the walls of structure 36. Longitudinal movement of the bar obviously causes movement of clutch member 52 to selectively engage one of gears 40 or 41 or to place it in neutral position between them.

Referring again to shaft 51, it will be noted that a spring 56 is in position to react between the wall of structure 36 and yoke 50 to normally hold the clutch 48 in driving engagement with gear 44. An arm 57 is pivotally mounted on the inner end of shaft 51 and a roller 58 is mounted on the free end of the arm. An operating rod 59 is also attached to the free end of the arm as shown. The rod extends outside the wall of structure 36 and carries a tooth 60. Dotted lines in Fig. 6 indicate that the rod 59 may be moved inwardly to position the arm 57 in alignment with shaft 51, with the tooth 60 engaged behind the wall of structure 36 to hold the arm in aligned position.

The bar 55 is disposed in the path of the roller 58 and the surface engaging the roller is fashioned to form a cam with a low portion 61 and a high portion 62. As above noted, the bar 55 is longitudinally movable so as to move the clutch 52 and it will now be apparent that movement of the bar from the solid to the dotted line position in Fig. 6, with the arm 57 locked in dotted line position, moves the cam face 62 into position to force arm 57, and yoke 50 outwardly to disengage the clutch 48. Thus with the arm 57 in aligned position the bar 55 may be moved toward the right to move clutch 52 out of engagement with gear 40 to neutral position without effect on clutch 48, but further movement of the bar, toward the position which would place clutch 52 in engagement with gear 41, would also place cam 62 in engagement with roller 58 to disengage clutch 48. It will be apparent then that when clutch 52 is moved into engagement with gear 41 clutch 48 is simultaneously disengaged.

The foregoing has described the action of the mechanism when the parts are in dotted line position.

It will be apparent that with the arm 57 in the offset position shown in solid lines, wherein roller 58 is not in the path of cam 62, the bar 55 may be moved back and forth to operate clutch 52 while at the same time clutch 48 remains engaged.

Referring to Fig. 1, it will be noted that gear 38 is meshed with one of the gears of the baler 7 drive mechanism whereby it is rotated when the mechanism is in operation and through the arrangement noted all of the gears of the unit are continuously rotated.

Shaft 42 has driving connection, through a break-down clutch 63, with a shaft 64 which carries a sprocket 65, Fig. 4, having driving connection through a chain 66 with the shaft 15' of the cross feed conveyor.

Shaft 45 carries a sprocket 67 which is driven with the shaft through a break-down clutch 68 and has driving connection with shaft 18 of the elevator conveyor through a sprocket 69 and chain 70.

The bar 55 is connected through a link 71 to an arm 72 affixed to a shaft 73 which carries a manually accessible handle 74 disposed at one side of the baler frame, as indicated in Fig. 3, in position to be conveniently reached by an operator stationed on platform 29.

Operation of the mechanism is as follows:

For use in baling while moving over the field, the arm 57 is placed in offset position and the bar 55 is placed as shown in Fig. 6 with clutch 52 engaged with gear 40 to drive the cross feed conveyor in forward direction toward the baler.

With the above arrangement the pick-up mechanism and elevator conveyor are obviously driven to gather and transport straw to the cross feed conveyor whence it is delivered to the baler.

When a bale is completed and a separating block is to be inserted an operator may manipulate the handle 74 to slide the bar 55 toward the left in Fig. 3 to disengage the clutch 52 from gear 40 and engage it with gear 41, which is obviously rotating in direction opposite gear 40.

Engagement with gear 41 causes reverse movement of the cross feed conveyor and the straw stream is thus stopped and pulled back away from the baler whereby the stream is broken. The separating block is easily placed, after which the operator restores the bar 55 to original position causing the straw stream to be again directed into the baler. It will be seen that the mechanism is easily and quickly controlled by the operator who supervises changing of the separating blocks and thus the work is efficiently done.

When it is desired to bale from a stack, with the machine stationary, the rod 59 is moved inwardly to place the arm 57 in aligned position as described and bar 55 is positioned so as to engage clutch 52 with gear 40 as before.

With the parts in this position, straw pitched onto the elevating conveyor is fed into the baler in the regular way. When a separating block is to be placed the handle 74 is manipulated as before to reverse the cross feed conveyor, but in this instance the elevating conveyor is stopped and the straw lying upon it is not delivered to the cross feed conveyor.

In view of the foregoing it will be apparent that my invention provides an efficient and simple means for distributing power from a driving source to the several elements of a combine baler machine.

Modifications of structure are obviously possible without alteration of the principle involved. I do not wish to be limited in structure or function except within the scope of the appended claim.

What I claim is:

In a combine apparatus for gathering hay from the ground and transferring the same to a baler mechanism, including a pick-up and a conveyor mechanism capable of gathering hay from the ground and discharging the same into a second conveyor mechanism, the conveyor mechanism having one end so arranged as to discharge into a baler, said conveyor mechanism being operable in opposite directions to transport the hay toward or from the baler mechanism, means for operating said pick-up and said conveyor comprising, a power supply including a shaft, a drive gear secured to said power shaft, a first driven shaft having connection with said conveyor, a pair of driven gears meshing with said drive gear and rotatably mounted upon said driven shaft, means for connecting either of said driven gears with said driven shaft for rotating the latter, a second driven shaft having connection with said pick-up, means for connecting and disconnecting said second driven shaft with and from said power shaft, and interlocking means for rendering one of said connecting means inoperative upon a predetermined operation of the other connecting means.

LESLIE R. TALLMAN.